No. 856,966. PATENTED JUNE 11, 1907.
R. S. & G. D. LEWIS.
HAY STACKER.
APPLICATION FILED SEPT. 26, 1906.

2 SHEETS—SHEET 1.

Witnesses.
Inventors.

No. 856,966. PATENTED JUNE 11, 1907.
R. S. & G. D. LEWIS.
HAY STACKER.
APPLICATION FILED SEPT. 26, 1906.
2 SHEETS—SHEET 2.
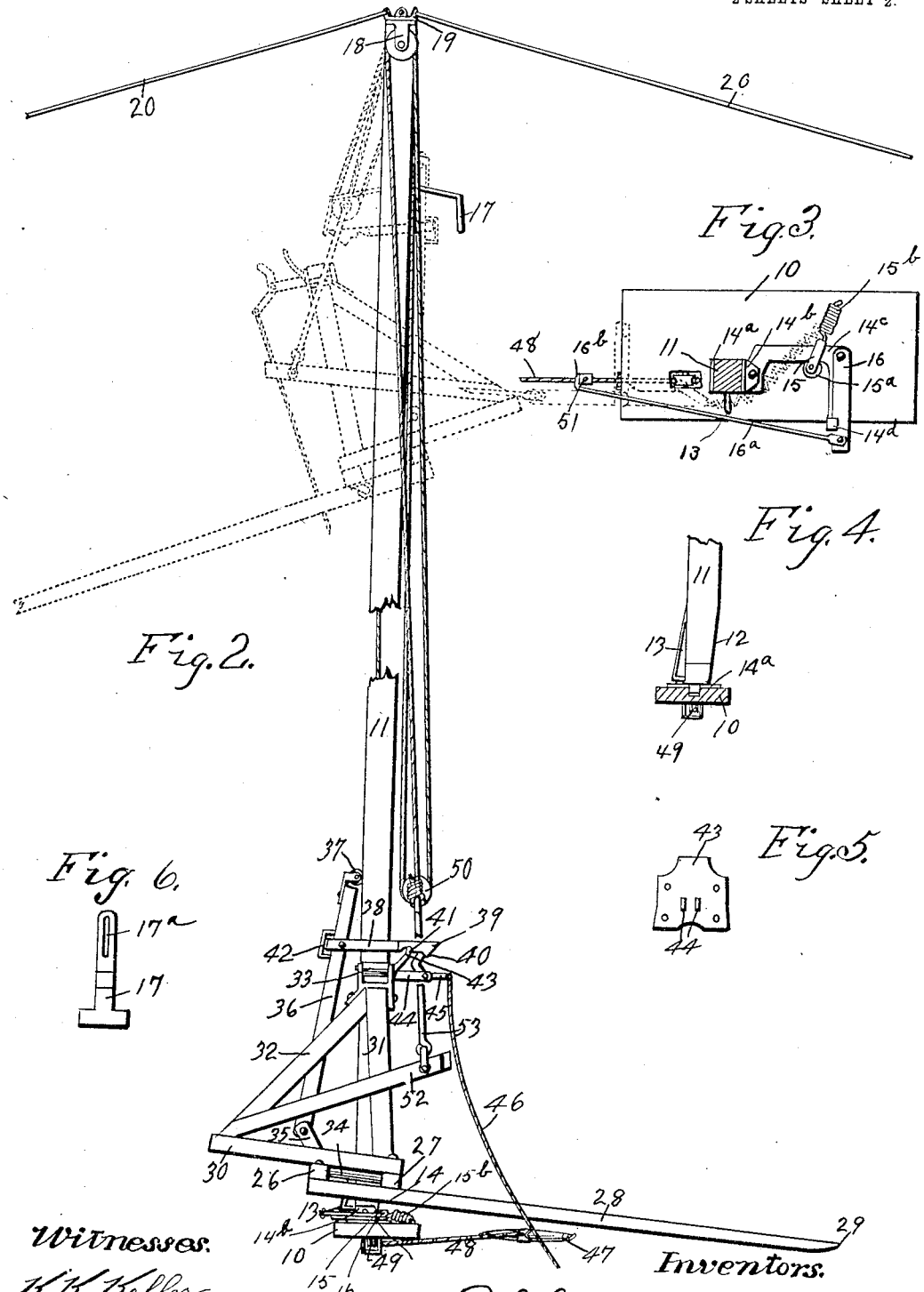

UNITED STATES PATENT OFFICE.

ROBERT S. LEWIS AND GEORGE D. LEWIS, OF RUSSELL, IOWA.

HAY-STACKER.

No. 856,966.  Specification of Letters Patent.  Patented June 11, 1907.

Application filed September 26, 1906. Serial No. 336,368.

*To all whom it may concern:*

Be it known that we, ROBERT S. LEWIS and GEORGE D. LEWIS, citizens of the United States, residing at Russell, in the county of Lucas and State of Iowa, have invented a certain new and useful Hay-Stacker, of which the following is a specification.

This invention relates to that class of hay stackers in which the hay platform is mounted for up and down movement on a single upright standard.

Our object is to provide a stacker of this kind of simple, durable and inexpensive construction in which the hay platform is so arranged with relation to the upright standard that when loaded, its weight will be approximately balanced to thereby avoid, or at least greatly decrease the amount of lateral strain upon the upright standard and at the same time to avoid binding strains upon the upright standard, so that the hay platform may be elevated with a minimum of friction.

A further object is to provide means for permitting the forward ends of the hay platform tines to rest on the ground without the necessity of digging a ditch for the base of the upright standard.

A further object is to provide improved automatic means for turning the hay platform a half revolution so that hay may be received on one side of the upright standard and delivered on the other.

A further object is to provide an improved trip device capable of being either manually operated to dump the hay platform at any point of elevation or to be automatically operated to dump the hay platform at its upper limit.

A further object is to provide improved means for quickly and easily adjusting the guy wires or ropes that support the upright standard to thereby cause the standard to be placed in a vertical position.

Our invention consists in the construction, arrangement and combination of the various parts of the device, whereby the objects contemplated are attained, as hereinafter more fully set forth, pointed out in our claims and illustrated in the accompanying drawings, in which—

Figure 1:
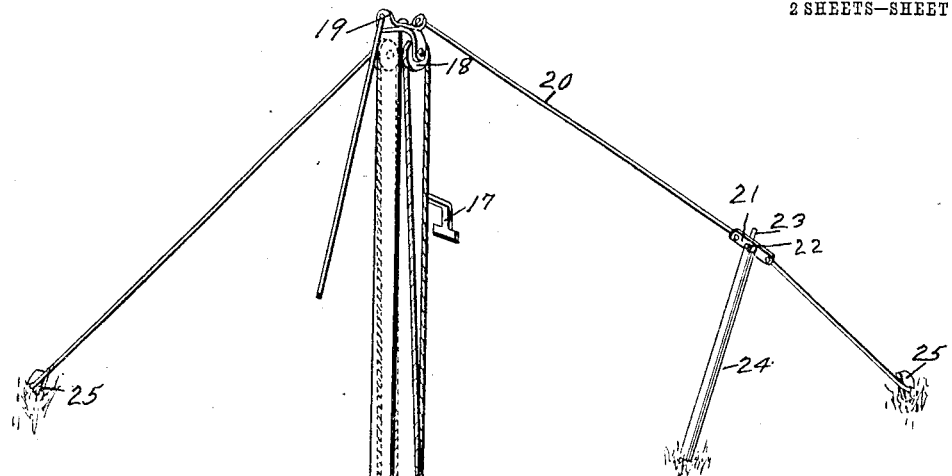
Figure 1:
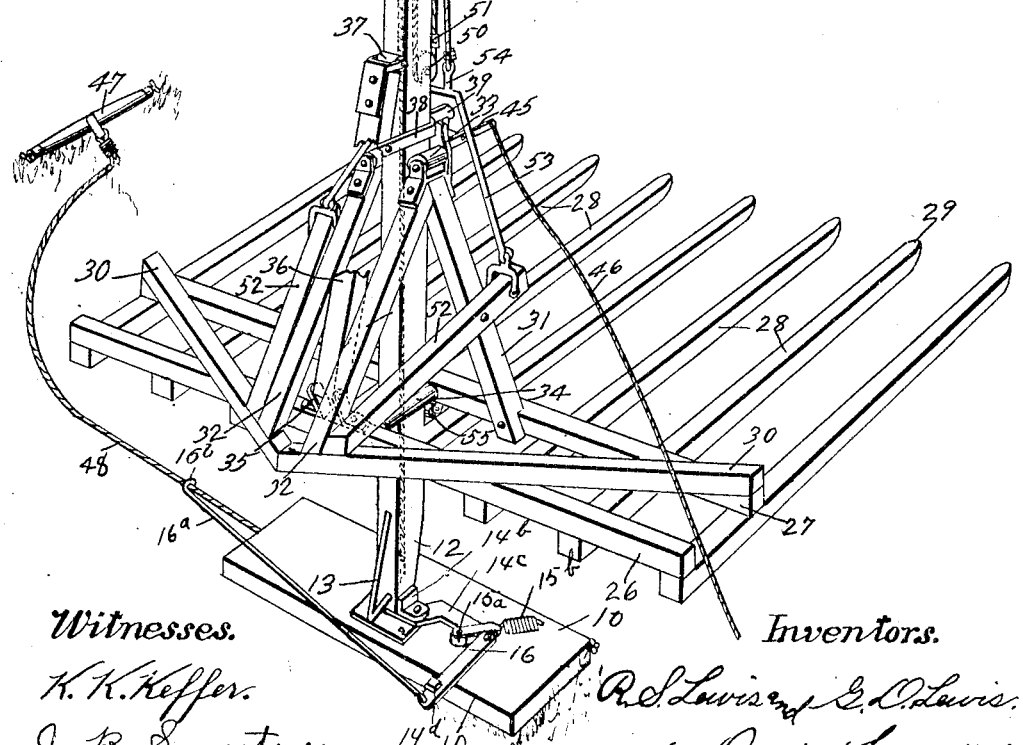

Figure 1 shows a perspective view of a complete hay stacker embodying our invention with the hay platform in position slightly elevated above the ground. Fig. 2 shows a side elevation of the complete stacker embodying our invention with the hay platform in position at its lower limit of movement. The dotted lines in said figure show the hay platform at its upper limit of movement and in a dumping position. Fig. 3 shows a transverse, sectional view through the upright standard just above the base to illustrate the means for automatically turning the upright standard. The dotted lines in said figure show the position of the parts after the upright standard has been turned a half revolution. Fig. 4 shows a detail, sectional view of the base with the lower end of the standard mounted therein. Fig. 5 shows a detail front view of the bracket for supporting the guide rollers, and Fig. 6 shows a detail front view of the trip arm for automatically dumping the hay platform.

Referring to the accompanying drawings, we have used the reference numeral 10 to indicate the base which is designed to rest on top of the ground. Rotatably mounted on the base is the upright standard 11 preferably rectangular in cross section and of uniform thickness throughout. Near the lower end of the upright standard the forward face thereof is inclined downwardly and rearwardly at 12 and on the rear face of the standard is a spring wire 13 fixed to the standard at its top and extended downwardly and rearwardly at about the same incline as the face 12, for purposes hereinafter made clear. A plate 14$^a$ is secured to the lower end of the standard and is rotatably mounted on the base 10. At one side is a lug 14$^b$. This lug supports an arm 14$^c$ which is approximately in the form of a right angle and which has a stop 14$^d$ at its outer end. Mounted upon the arm 14$^c$ is a loop 15 containing a roller 15$^a$ to engage one edge of the arm 14$^c$. A spring 15$^b$ is attached to said loop and to a part of the base 10. Pivoted to the arm 14$^c$ near its corner is a lever 16 designed to engage, and have its movement limited by, the stop 14$^d$. Pivoted to the outer end of the lever 16 is a rod 16$^a$ having a loop or ring 16$^b$ in its outer end designed to receive a rope, hereinafter described. In practical use with this portion of the device, it is obvious that the spring 15$^b$ will normally hold the arm 14$^c$ in the position shown by solid lines in Fig. 3. If, however, the rod 16$^a$ is pulled against the pressure of the spring 15$^b$, then the lever 16 and the arm 14$^c$ will be turned around a half revolution until the parts reach the positions shown by dotted lines in said figure, and when this occurs the lever 16 will stand substantially at right angles to the part of the arm 14ᶜ which it paralleled in its first position and the loop 15 with its roller will slide along the arm 14ᶜ to a point near the standard 11. Then as soon as the pressure upon the rod 16ᵃ is removed, the spring will return the arm 14ᶜ to its original position and the lever 16 will be returned to its position parallel with the outer portion of the arm 14ᶜ. At a point near the top of the standard 11 is a trip arm 17 projected forwardly and then downwardly. This arm is adapted for adjustable connection to the standard by having a slot 17ᵃ formed therein to receive a bolt. At the top of the standard are two pulleys 18 arranged on opposite sides and above the pulleys is a plate 19 to receive the guy wires or ropes 20. One of these guy wires or ropes is provided with a flat plate 21 having a central opening 22. This central opening is designed to receive the pin 23 of a pole 24. The function of this pole and the plate 21 is as follows: The several guy wires are first attached to stakes 25 in the usual way and the upright standard thereby supported in as near a vertical position as practicable. After the stakes are thus driven and the guy wires loosely positioned and in the event that the standard is not perfectly vertical, the operator may, by shifting the base 10 easily place the standard in an upright position and then, by using the pole 24 on one of the guy wires, stretch the same sufficiently to support the upright standard in a vertical position.

The hay platform is of the usual construction and comprises two cross pieces 26 and 27 and a number of straight tines 28 with pointed ends 29, said cross pieces and tines being firmly fixed together. Extended from the ends of the cross pieces 27 are two braces 30 inclined inwardly and rearwardly and connected at their rear ends in the rear of the cross piece 26, said bars being fixed to said cross pieces 26 and 27. A guide frame is fixed to the central portion of the cross piece 27 and to the central portion of the braces 30, which guide frame comprises two uprights 31 fixed at the lower ends to the cross piece 27 and extended upwardly and rearwardly and toward each other and two uprights 32 and with their lower ends fixed to the brace 30 and the upper portions extended upwardly and forwardly and attached to the tops of the parts 31. Mounted at the upper end of this guide frame are two guide rollers 33 arranged to loosely engage the sides of the upright standard 11. Mounted between the central portions of the cross pieces 26 and 27 are two guide rollers 34 to loosely engage the sides of the upright standard. The bracket in which the rollers 33 are mounted extends across the front of the upright standard 11 and thus prevents the hay platform from tilting upwardly and rearwardly, but the guide frame is so arranged that the hay platform may freely tilt downwardly and forwardly.

We have provided means for normally holding the hay platform in a substantially horizontal position and yet permitting it to tilt downwardly and forwardly at the proper times as follows: Mounted on the rear cross piece 26 are the brackets 35 arranged to pivotally support the guide arm 36, which arm projects upwardly and forwardly above the guide frame and is provided with a roller 37 to engage and slide upon the rear face of the upright and minimize the friction. Pivoted to the upper portion of the guide arm 36 is a loop 38 which extends around the guide arm and also around the upright standard 11 and is provided with a forwardly projecting hook 39 having an inclined shoulder 40 on the under surface of its forward end and a shoulder 41 near its rear end. Fixed to the guide arm 36 is a limiting stop 42 arranged to limit the up and down pivotal movements of the part 38 so that said part will not bind upon the upright 11.

Formed on or fixed to the bracket that supports the rollers 33 is an arm 43 to project upwardly and to engage the shoulder 41. Adjacent to the arm 43 is a bracket 44 projected straight forwardly and having a trip lever 45 pivoted therein, one end of which engages the inclined shoulder 40 and the other end projects forwardly and is provided with a trip rope 46. By this arrangement, it is obvious that, when the rope 46 is pulled downwardly, the trip lever will elevate the arm 39 above the arm 43 so that the hay platform may tilt downwardly and forwardly to discharge its load. In this connection, we have provided means for automatically operating the trip lever 45 when at its upper limit, by means of the trip arm 17, before described, which is so shaped and disposed that it will be engaged by the forwardly projecting end of the trip lever 45. We have provided for raising the hay platform as follows: The reference numeral 47 indicates a whiffle-tree to which a draft animal may be attached and 48 indicates a cable or rope attached thereto. This cable or rope is first extended through the loop 16ᵇ of the arm 16ᵃ, then under the pulley 49 which is mounted in the base 10, then over one of the pulleys 18 which is mounted near the top of the upright standard, then under a pulley 50 which is connected with the hay platform, in a manner hereinafter described, then over the other pulley 18 and then finally attached to the hay platform. A small collar 51 is attached to the cable or rope 48 and is of such size that it will freely pass over the pulleys and yet will not pass through the loop 16ᵇ.

Two levers 52 are fixed to the central portions of the parts 31 of the guide frame and are extended downwardly and rearwardly and fixed to the central portion of the braces 30. The forward ends of these levers extend in front of the uprights 31 and a bail 53 is attached to the said forward ends and extended straight upwardly. This bail supports the pulley 50, before described, and is provided with a loop 54 to which the end of the cable or rope 48 is attached.

Mounted on the central portion of the cross piece 27 is a roller 55 designed to engage the front face of the upright standard 11 to minimize the friction at that point.

In practical use and assuming the parts to be arranged, as shown in Fig. 2, a load of hay may be placed on the hay platform by means of a large rake or in any suitable way. Then the draft animal connected with the rope 58 is advanced. This causes an upward pull upon the bail 53 which in turn pulls upwardly on the forward ends of the levers 52 and pushes downwardly at the rear ends thereof. The weight of the hay platform and its guiding frame is such that after it has been tilted to discharge, it will return to its horizontal position and the trip lever 45 and the arm 43 will engage the hook 39. However, when said platform is loaded with hay, the entire load and the weight of the platform will be almost centered below the bail 53 so that there will be a minimum of friction upon the standard 11 and very little side pressure. Hence comparatively light guy wires may be used as the strain upon them will be very small. The load will be easily elevated because of the rollers 33, 34, 37 and 55 and because of the arrangement of the cable around the various pulleys. When the collar 51 strikes the loop 16$^b$, then the upright standard and hay platform will be turned a half revolution by means of the pull upon the arm 16 by the rod 16$^a$, as before described. When the operator desires to have the load discharged, he pulls downwardly upon the trip rope 46, thus permitting the hay platform to tilt downwardly and forwardly and the load to be discharged or if the operator fails to pull the trip rope the load will be automatically discharged by the arm 17. Then when the rope or cable is slackened, the hay platform will descend by gravity until it reaches the lower portion of the upright standard. Before this point is reached, the upright standard is turned a half revolution, to its position for receiving a load, by means of the spring 15$^b$ operating on the arm 14$^c$. When the hay platform reaches the inclined surface 12 at the lower end of the standard, the roller 55 will follow said face and the spring 13 at the rear of the standard will be engaged by a part of the frame and the hay platform will be tilted to the position shown by solid lines in Fig. 2, without affecting in any way the trip device for supporting the hay platform. This feature of inclining the platform is of advantage because the base 10 may be placed on top of the ground without the necessity of digging a pit for it and yet the forward ends of the tines will rest on the ground and be in position to readily and easily receive a load of hay.

Having thus described our invention, what we claim and desire to secure by United States Letters Patent, therefor is—

1. In a hay stacker, the combination of an upright standard, a hay platform arranged to slide vertically upon said standard in a substantially horizontal position, a trip device for normally holding the hay platform in a substantially horizontal position and for permitting it to swing downwardly to discharge a load when the trip device is released and means for automatically tilting the hay platform downwardly when at its lower limit of movement without releasing the trip device.

2. In a hay stacker, the combination of an upright standard, a guide frame slidingly mounted thereon and capable of tilting movement relative thereto, a trip device normally holding the guide frame in an upright position, a hay platform firmly fixed to the guide frame to tilt in unison therewith.

3. In a hay stacker, the combination of an upright standard, a hay platform, a guide frame firmly fixed to the hay platform and capable of tilting with the hay platform relative to the standard and means for elevating the hay platform relative to the standard.

4. In a hay stacker, the combination of an upright standard, a hay platform comprising cross pieces and tines, a guide frame mounted on the cross pieces and fixed thereto, rollers carried by the guide frame and platform to engage the standard, levers fixed to the guide frame in front of the standard and in the rear of the standard, a bail connecting the forward ends of said levers and a platform elevating rope secured to said bail.

5. In a hay stacker, the combination of an upright standard, a hay platform, a guide frame fixed to the hay platform, a guide arm pivoted to the hay platform in the rear of the standard and extended upwardly and rearwardly to slidingly engage the rear of the standard, said guide frame arranged to permit the platform to tilt relative to the standard, means for holding said guide arms close to the standard and means for elevating the hay platform.

6. In a hay stacker, the combination of an upright standard, a hay platform, a guide frame fixed to the hay platform, a guide arm pivoted to the hay platform, a loop pivoted to the guide arm and slidingly connected with the upright standard, a latch device for connecting the guide frame with said loop and means for elevating the hay platform.

7. A hay stacker, comprising an upright standard, a hay platform, a guide frame fixed to the hay platform, a guide arm pivoted to the hay platform, a loop pivoted to the guide arm and surrounding the upright standard, a hook projecting forwardly from said loop, an arm connected with the guide frame to engage said hook and hold the platform against tilting movement and a manually operated trip lever for disengaging the hook from the arm on the guide frame.

8. A hay stacker, comprising an upright standard, a hay platform, a guide frame fixed to the hay platform, a guide arm pivoted to the hay platform, a loop pivoted to the guide arm and surrounding the upright standard, a hook projecting forwardly from said loop, an arm connected with the guide frame to engage said hook and hold the platform against tilting movement, a manually operated trip lever for disengaging the hook from the arm on the guide frame and an adjustable trip arm fixed to the upper portion of the upright standard to engage said trip device and automatically elevate the hook on the pivoted loop.

9. A hay stacker, comprising an upright standard, a hay platform, comprising cross pieces and tines, said standard inserted in the hay platform between the cross pieces, rollers fixed to the cross pieces to engage the sides of the standard, a roller connected with the platform to engage the front of the standard, a guide frame fixed to the hay platform and having rollers at its top to engage the sides of the standard, a guide arm pivoted to the rear cross piece of the platform and having a roller at its top to engage the rear of the upright standard, a loop pivoted to the said guide arm and surrounding the upright standard and having a hook at its forward end, an arm fixed to the front of the guide frame to be engaged by said hook, a trip lever carried by the guide frame to engage said hook, a rope connected therewith for manually operating it, a trip arm adjustably fixed to the upright standard for automatically operating the trip lever, levers fixed to the guide frame, a bail secured to said levers in front of the standard and an elevating rope fixed to said bail.

10. In a hay stacker, the combination of an upright standard, a guide frame slidingly mounted thereon and capable of tilting movement relative thereto, a trip device normally holding the guide frame in an upright position, a hay platform firmly fixed to the guide frame to tilt in unison therewith and an elevating rope attached to the guide frame in front of the standard.

11. In a hay stacker, the combination of an upright standard, a hay platform arranged to slide vertically upon said standard in a substantially horizontal position and means for holding said platform with its front end tilted downwardly when at the base of the standard, the lower portion of the forward face of said standard inclined downwardly and rearwardly to permit the hay platform to assume a tilted position when at its lower limit of movement.

12. In a hay stacker, the combination of a rotatable upright standard, an arm connected therewith, a lever attached to the arm, a rod pivoted to the lever and having a loop at one end, a hay platform slidingly connected with the standard, an elevating rope passed through the loop in said rod and extended to the top of the standard and connected with the hay platform and a collar on the said rope to engage the said loop for automatically turning the standard when the platform is being elevated.

13. In a hay stacker, the combination of a rotatable upright standard, an arm connected therewith, a lever attached to the arm, a rod pivoted to the lever and having a loop at one end, a hay platform slidingly connected with the standard, an elevating rope passed through the loop in said rod and extended to the top of the standard and connected with the hay platform and a collar on the said rope to engage the said loop for automatically turning the standard when the platform is being elevated and a spring connected with the said arm for automatically returning the standard when the elevating rope is slackened.

14. In a hay stacker, the combination of a base, a standard rotatably mounted on the base, an arm fixed to the standard and extended laterally, a lever pivoted to said arm, a rod pivoted to the lever and having a loop in its end, a hay platform slidingly mounted on the standard, a pulley at the base of the standard, two pulleys at the top of the standard, a pulley connected with the hay platform, a rope passed through the loop in the rod, under the pulley at the base of the standard, over one of the pulleys at the top of the standard, under the pulley attached to the hay platform, over the other pulley attached to the top of the standard and having its end attached to the hay platform and a collar fixed to said rope capable of passing around said pulleys and designed to engage the loop on the said rod for automatically turning the standard.

15. In a device of the class described, the combination of a standard, a number of guy wires connected with its upper end, one of said guy ropes provided with a perforated plate, and a pole having a projection thereon designed to enter the perforation in said plate.

16. A hay stacker, comprising an upright standard, a hay platform slidingly mounted upon said standard, guiding devices for holding the hay platform in a substantially horizontal position on the standard, the lower end of said standard having its front face inclined downwardly and rearwardly and a spring on the rear face of the standard extended downwardly and rearwardly to engage a part of the hay platform and cause it to tilt when at its lower limit of movement.

17. In a hay stacker, the combination of a base, a standard rotatably mounted on the base, an arm connected to the standard and having a substantially right-angled extension, a stop at the outer end of said arm, a lever pivoted to the arm to be engaged by said stop, a rod pivoted to the outer end of the lever and a spring connected with said arm, said spring capable of permitting the standard to move a half revolution and of returning it when released.

18. In a hay stacker, the combination of a base, a standard pivoted to the base, an arm projected from one side of the standard and having a right-angled extension and a stop at the outer end of said extension, a loop slidingly mounted upon the arm and having a roller therein to engage the arm, a spring connected with the loop and fixed to the base, a lever fulcrumed near the corner of said arm to engage said stop, a rod pivoted to the outer end of the lever and having a loop in its other end, a rope passed through said loop and a collar on the rope to engage the loop.

ROBERT S. LEWIS.
GEORGE D. LEWIS.

Witnesses:
   ALLIE. G. DOTTS,
   THOMIS J. HANCOCK.